May 5, 1936. E. T. JANSSON 2,039,421

PROCESS AND APPARATUS FOR MILKING

Filed Nov. 16, 1933

WITNESS:

INVENTOR
Ernst Tage Jansson
BY
Busser and Harding
ATTORNEYS

Patented May 5, 1936

2,039,421

UNITED STATES PATENT OFFICE 2,039,421

PROCESS AND APPARATUS FOR MILKING

Ernst Tage Jansson, Stockholm, Sweden, assignor to The De Laval Separator Company, New York, N. Y., a corporation of New Jersey Application November 16, 1933, Serial No. 698,258
In Sweden November 26, 1932

3 Claims. (Cl. 31—58)

In milking machines the most generally used type of teat cup consists of an elastic rubber teat liner enclosed in a rigid shell. The inner or milk chamber, enclosed by the liner and surrounding the teat, is connected with the milk pail by a tube, the pail in turn being connected with the vacuum pipe line. The outer or pulsation chamber, between the liner and shell, communicates through a tube with an element which puts said chamber alternately into communication with the atmosphere and the vacuum pipe line. Atmospheric pressure and partial vacuum are thereby alternately generated in the pulsation chamber, thereby producing a pneumatic pulsating action on the teat. Experience has shown that the intensity and the duration of the pressure are very important factors for the milking. Milking machines have heretofore been constructed according to two different principles, which are illustrated in the accompanying Figures 1 and 2. In both figures the abscissa represents the time and the ordinate the pressure in the chamber between the shell and the liner.

Figure 1:
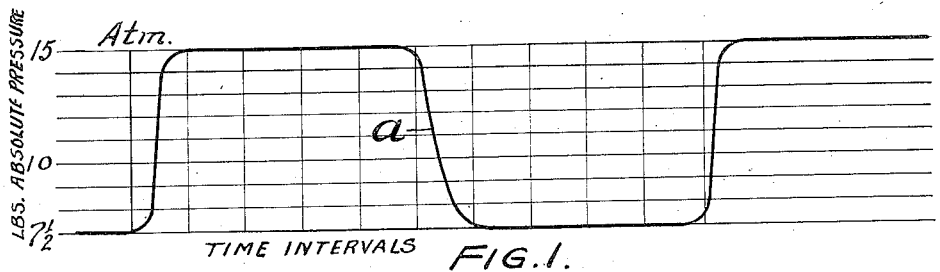

In milking machines in which pressure alternations according to Figure 1 are produced, the pulsator is usually positioned immediately below the teat cup in order to make the tubes between the teat cup and the pulsator as short as possible, as thereby as sharp alternations as possible between vacuum and atmospheric pressure are produced. The denomination "pulsator" should also be understood to comprise mechanisms, known as secondary or udder pulsators, which are operated by a pulsating vacuum from a special pipe and put the outer chambers of the teat cups alternately into connection with vacuum and the outer atmosphere.

Milking machines in which the pressure alternations are conveyed slowly to the pulsation chamber of the teat cup have an action illustrated by a curve according to Diagram 2. In milking machines of this type the pulsator is generally connected with the teat cup by a narrow passage which offers great resistance to the movement of the air in both directions.

Figure 2:
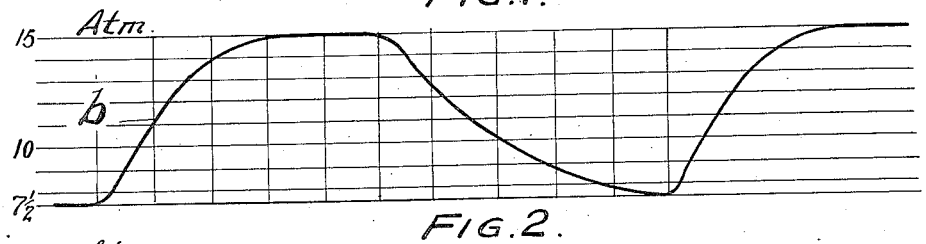

Machines with pressure alternations according to Figures 1 and 2 have in common the feature that the vacuum and the pressure intervals are of about the same duration.

Figure 3:
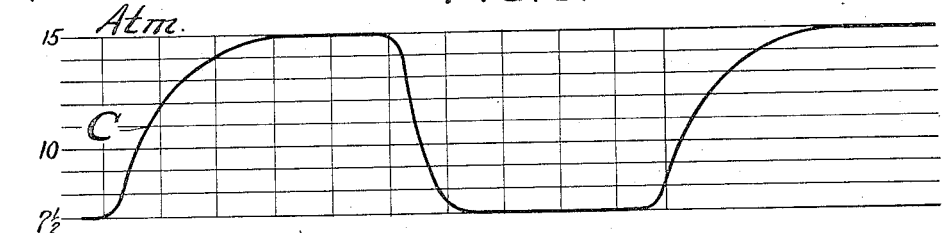

I have found that a milking machine in which the pressure alternations are conveyed according to the curve $c$ shown in Figure 3 has certain advantages over the above mentioned types. The inhalation of the air into the pulsation chamber of the teat cup takes place approximately in accordance with the curve $b$ of Figure 2, whereas the evacuation of air takes place according to the curve $a$ of Figure 1. In this way the vacuum created in the said chamber is maintained for a sufficiently long period to insure effectively against the falling of the teat cup off the teat, which at the same time is more efficiently massaged.

Figure 4:
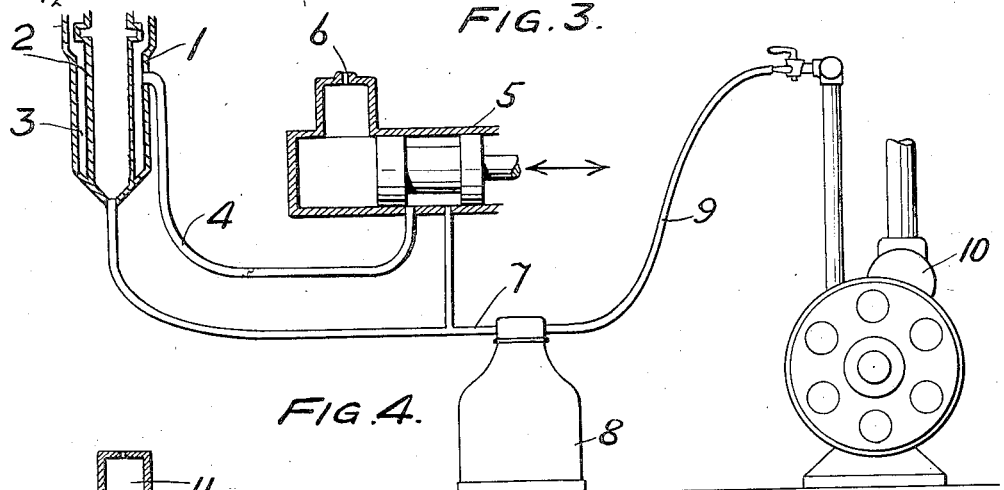
Figure 5:
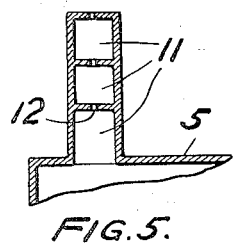
Figure 6:
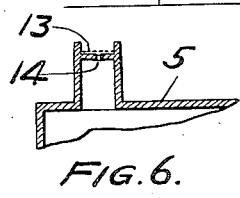
Figure 7:
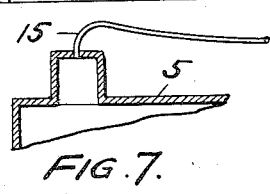

The invention will be described in connection with the accompanying drawing, Figures 1 and 2 of which, as above described, illustrate pneumatic pulsation curves in teat cups of milking machines of known type, and Fig. 3, as above described, illustrates a pneumatic pulsation curve in teat cups of milking machines in accordance with my invention. Fig. 4 is a diagram of a complete milking machine embodying my invention. Figs. 5, 6 and 7 are detail views showing different means for effecting a throttling of the atmospheric air flowing into the valve chamber of the pulsator.

In Fig. 4, 1 is the teat cup shell, 2 the teat cup liner, 3 the pulsation chamber between the shell and liner, and 4 a tube connecting the chamber 3 with the pulsator 5. The latter in turn communicates with the atmosphere by the tube or inlet 6, and, by a tube 7, with the milk pail 8, which communicates with a vacuum pump 10 by a tube 9. In order to produce a diagram according to Fig. 3, the tubes 4 and 7 should have such dimensions as to offer no great resistance to the movement of the air, which is necessary to bring about a quick evacuation of the chamber 3. On the other hand, the tube 6 should offer a great resistance to the air current. This may be attained in various ways, as, for example, by various forms of throttling. Thus the tube 6 may be of restricted diameter and should also be very short to prevent clogging, as shown in Fig. 4. It is also possible to reduce the risk of clogging of the throttling by means of an air cataract, one form of which is shown in Fig. 5, in which 11 is a series of chambers, the inner of which communicates with the valve chamber of the pulsator and, by a restricted opening 12 with the next chamber of the series, which, by a similar restricted opening, communicates with another chamber of the series; the last chamber, by a similar restricted opening, communicating with the atmosphere. It is also practicable to provide a strainer 13 having very small holes through which atmospheric air passes before entering the pulsator through the restricted orifice 14, which is of greater area than the holes in the strainer.

Instead of throttling by means of an opening of small area and short axial extension, it is possible to create the necessary resistance to the atmospheric air current by making the air inlet tube 15 relatively long and fixing the relation between the diameter and the length in such a way that the desired air-resistance is brought about, as shown in Fig. 7.

What I claim and desire to protect by Letters Patent is:

1. In a milking machine comprising a teat cup composed of a shell and within the shell an elastic liner providing a pneumatic pulsation chamber between the shell and the liner, an air conduit communicating with said pulsation chamber, a source of vacuum, and a pneumatic pulsator valve adapted to connect said conduit alternately with the source of vacuum and with the atmosphere and to maintain said connections for predetermined time periods; means providing a resistance to inflow of atmospheric air to said chamber substantially greater than the resistance to outflow of air from said chamber to the source of vacuum, said means comprising an air flow passage between the valve chamber of the pulsator and the atmosphere which is throttled relatively to the air flow passage in said conduit and the air flow passage from the valve chamber of the pulsator to the source of vacuum.

2. The process of producing pneumatic pulsations in the air conduit that is continuously open to the pulsation chamber of a double chamber teat cup of a milking machine, which comprises reducing the absolute pressure in said conduit from the maximum pressure to the minimum pressure desired in a relatively short time period, then maintaining said minimum pressure in said conduit for a relatively long time period, then relatively slowly building up the pressure in said conduit to the maximum, and then maintaining the maximum pressure in said conduit for a time period which is short compared with said time period of minimum pressure.

3. The process of producing pneumatic pulsations in the air conduit that is continuously open to the pulsation chamber of a double chamber teat cup of a milking machine, which comprises reducing the absolute pressure in said conduit from the maximum pressure to the minimum pressure desired in a relatively short time period, then maintaining said minimum pressure in said conduit for a relatively long time period, then relatively slowly building up the pressure in said conduit to the maximum, and then maintaining the maximum pressure in said conduit for a time period which is short as compared with the time required to so build up such pressure.

ERNST TAGE JANSSON.